Dec. 30, 1930.  A. A. VAN ORSDALE  1,787,132
GRAVITY INDICATING SYSTEM
Filed May 22, 1926  2 Sheets-Sheet 1

INVENTOR.
Allen A. Van Orsdale,
BY
ATTORNEY.

Dec. 30, 1930.   A. A. VAN ORSDALE   1,787,132
GRAVITY INDICATING SYSTEM
Filed May 22, 1926   2 Sheets-Sheet 2
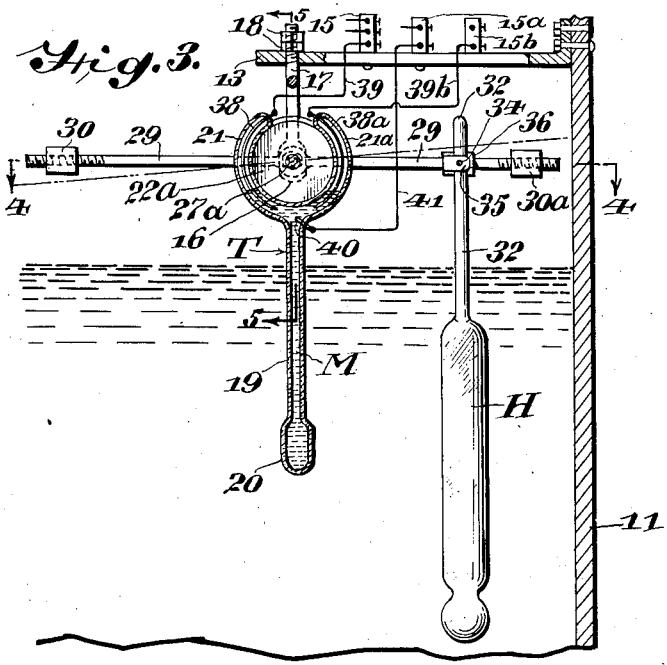
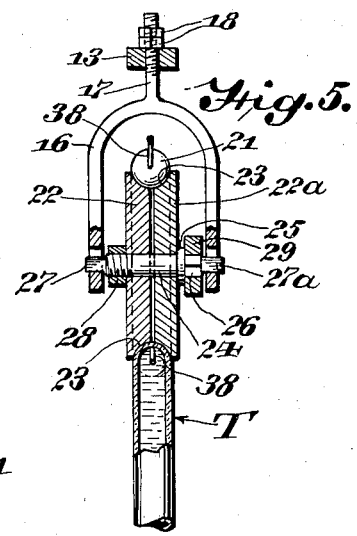
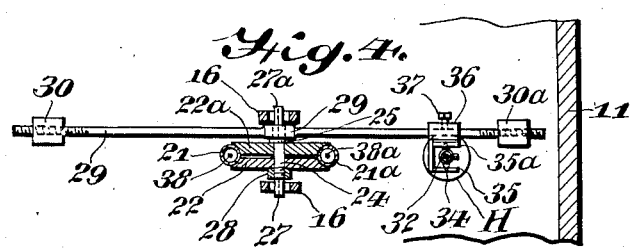
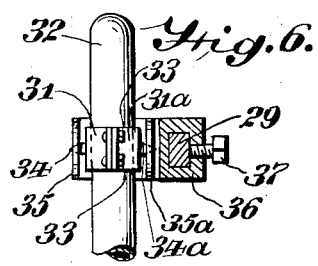
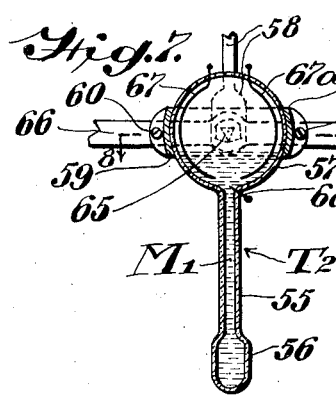
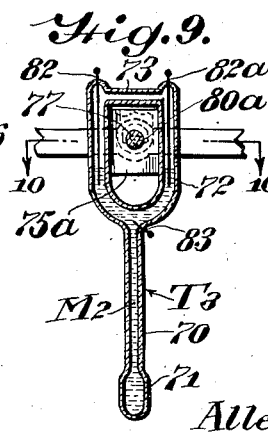
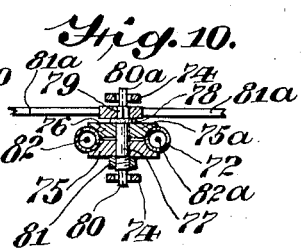
INVENTOR.
Allen A. Van Orsdale,
BY
Cornelius D. E Let
ATTORNEY.

Patented Dec. 30, 1930

1,787,132

UNITED STATES PATENT OFFICE

ALLEN A. VAN ORSDALE, OF HOUSTON, TEXAS, ASSIGNOR TO THE BROWN INSTRUMENT COMPANY, OF PHILADELPHIA, PENNSYLVANIA, A CORPORATION OF PENNSYLVANIA

GRAVITY-INDICATING SYSTEM

Application filed May 22, 1926. Serial No. 111,081.

My invention relates to a method of and apparatus for determining a fluid condition, as the specific gravity of a liquid, and more particularly, my invention relates to a method and apparatus for determining the specific gravity or concentration in degrees Baumé of a liquid at a standard temperature condition even though the temperature has departed from such standard.

In accordance with my invention, a temperature-responsive device tending to change the resistance of an electrical circuit in response to change in the temperature of a liquid is controlled by a float submerged therein and whose position varies with the specific gravity of the liquid.

My invention resides in the method and apparatus hereinafter described and claimed.

For an illustration of some of the various forms my invention may take, reference is to be had to the accompanying drawing, in which:

Fig. 3 is an enlarged vertical sectional view, partly in elevation, of a part of the apparatus shown in Fig. 1.

Fig. 4 is a horizontal sectional view on the line 4—4 of Fig. 3, looking in the direction of the arrows.

Fig. 5 is a vertical sectional view on the line 5—5 of Fig. 3, looking in the direction of the arrows.

Fig. 6 is an enlarged view, partly in section, showing the hydrometer supporting mechanism.

Fig. 7 is a vertical sectional view, partly in elevation, of a modified form of my invention.

Fig. 8 is a horizontal sectional view on line 8—8 of Fig. 7, looking in the direction of the arrows.

Fig. 9 is a vertical sectional view, partly in elevation, of a modified form of my invention.

Fig. 10 is a horizontal sectional view on line 10—10 of Fig. 9, looking in the direction of the arrows.

Figure 1:
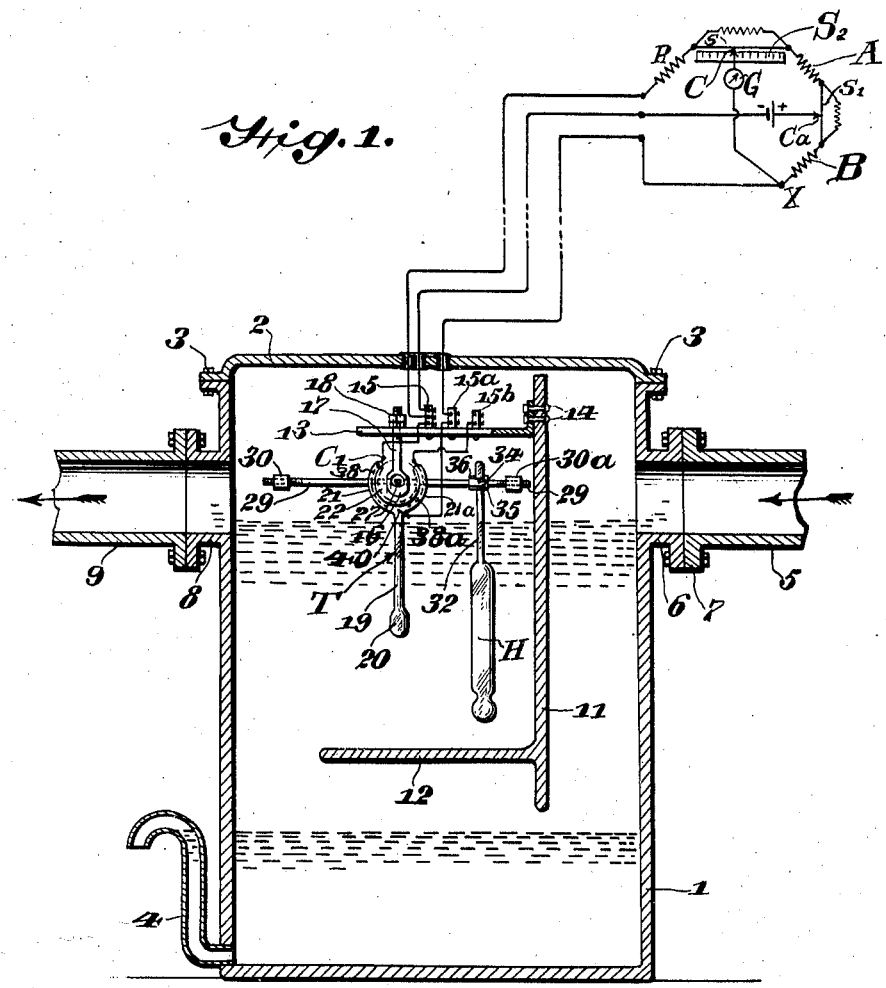
Fig. 1 is a vertical sectional view, partly in elevation, of apparatus constructed in accordance with my invention.

A contract of sale for oil ordinarily calls for the delivery of a specified amount of oil having a definite specific gravity at a certain standard temperature, as for example, 60 degrees F. The temperature of the oil at the point of shipment is usually different from this figure, and, since the specific gravity and volume of the oil vary with the temperature, it has heretofore been necessary for the shipper to determine both the specific gravity and temperature and then calculate the amount that must be shipped in order to effect delivery of the amount specified in the contract. Such determinations and calculations are time-consuming and somewhat laborious.

My invention finds one application in connection with a situation of the character above set forth. Obviously, the specific gravity of the oil may readily be ascertained at some constant temperature, as 60 degrees F. Within certain limits there is a definite constant relationship between temperature and specific gravity, that is, a certain change in temperature induces a corresponding change in specific gravity. Therefore, the effect of any change in specific gravity resulting from a change in temperature of the oil from 60 degrees F. may be substantially modified or cancelled by making a correction in accordance with and controlled by said change in temperature. As a result, the observed specific gravity of the oil will be independent of changes in specific gravity as induced by temperature change and will depend solely on change in quality or composition of the oil. With the effect of temperature thus eliminated, the amount of oil to be shipped to fulfill the specified contract may readily be determined, even though the observed specific gravity at the point of shipment is different from that specified in the contract.

As one example of structure that may be utilized for this purpose, there is shown in Figs. 1, 3, 4, 5 and 6 a tank or container 1 having a cover 2 suitably secured thereto, as by the bolts 3. If desired, as when non-miscible liquids are passed into container 1, an open ended pipe or conduit 4 may communicate with tank 1 adjacent the bottom thereof. To the end that the desired liquid or liquids may be passed through tank 1, the pipe or conduit 5 passing such liquid is suitably secured to the tank inlet port 6, as by the flanged connection 7. The tank outlet port 8 is suitably secured, as by the flanged connection 9, with a pipe or conduit 10 passing the liquid to storage, or other suitable destination.

A liquid directing plate 11, preferably formed integrally with tank 1 and extending transversely thereof, shields the apparatus hereinafter described from direct contact with liquid entering the tank through inlet port 6. A liquid deflecting plate 12 formed preferably integrally with plate 11, extends substantially at right angles thereto adjacent the bottom thereof. In this manner, there is provided a region or zone wherein the liquid has relatively small movement and into which extends the apparatus hereinafter described.

A plate 13 suitably supported within tank 1, as by plate 11 to which it is secured by bolts 14, or equivalent, carries a plurality of binding posts or terminals 15, 15a and 15b. A fork 16 terminating in a screw threaded rod 17 passes through a hole in the plate 13 and is retained in adjusted position in any suitable manner, as by the lock nuts 18. A temperature-responsive device T containing a suitable expansive fluid M, as mercury, and constructed preferably of glass, comprises a stem 19 terminating at one end in a bulb 20 and at its other end in a pair of curved arms 21 and 21a. The diameter of the bore of stem 19 should be small with respect to the diameter of bulb 20. Temperature-responsive device T may be exhausted to a suitable degree or may be supplied with an inert gas under suitable pressure, and is suitably supported for pivotal movement on fork 16. As one manner of so doing, a pair of clamping disks 22 and 22a, forming a substantially hemispherical groove 23, receive the curved arms 21 and 21a.

A shaft 24 passing centrally through and supporting disks 22 and 22a comprises a collar 25, a polygonal portion 26, and a pair of knife edges 27 and 27a. Disk 22a fits against collar 25, and a nut 28 threaded to shaft 24 engages disk 22 to hold both disks and the device T fixed relative to shaft 24. Knife edges 27 and 27a are received in aligned openings in the prongs of fork 16 and, accordingly, shaft 24 and the device T are freely oscillatory in said fork.

A balancing arm 29 has a perforation corresponding to and receiving the polygonal portion 26 of shaft 24, and is threaded at each end to receive the adjusting nuts or weights 30 and 30a. A submergible member H, as a hydrometer, is pivotally and adjustably secured, both horizontally and vertically, to the balancing arm 29. To this end, a pair of clamping rings 31 and 31a are fitted around the stem 32 of the hydrometer and held in adjusted position thereon by one or more bolts 33, or equivalent. The diameter of the bore of stem 32 should be small with respect to the diameter of the hydrometer bulb. Clamping rings 31 and 31a comprise, respectively, needle pivots 34 and 34a received, respectively, in recesses in a pair of arms 35 and 35a forming an integral part of the slide 36 adjustable on the balancing arm 29 and held in adjusted position thereon in any suitable manner, as by the locking screw 37.

Suitable wires or conductors 38 and 38a, of material having suitable specific resistance of preferably low or substantially zero temperature co-efficient of resistance, and preferably such as will not be wetted by mercury or other liquid used therewith, respectively extend longitudinally into arms 21 and 21a of the temperature device T. An alloy of nickel and chromium is an example of a metal that may advantageously be used. The free ends of said wires extend, respectively, into the columns of mercury in said arms adjacent each other, but not into engagement. The other ends of said wires are connected, respectively, by conductors 39 and 39a to binding posts 15 and 15b.

A contact 40 extending into the column of mercury between the free ends of resistance wires 38 and 38a is connected to the binding post 15a by a conductor 41.

Any suitable arrangement may be utilized for intermittently or constantly indicating the specific gravity of the liquid in tank 1 reduced to standard condition. Preferably, however, and as indicated in Fig. 1, I utilize a Wheatstone bridge of the slide wire type in which balance is maintained by adjusting the resistance of one arm of the bridge in such a way as to keep that arm always equal to the changing resistance of the circuit included between contact 40 and the particular resistance wire in use, whether 38 or 38a. As herein illustrated, resistance wire 38 is included in this circuit, it being understood that wire 38a may be substituted in the bridge for wire 38 under reverse conditions of operation, as when the hydrometer H is positioned on the other arm 29.

As shown in Fig. 1, A and B represent resistances in the ratio arms of a Wheatstone bridge, while R and the unknown resistance of the wire 38 are resistances in the other arms of the bridge. The bridge is held in balance by moving the contact C along the slide S until the resistance of the arm CRC1 is just equal to the resistance of the arm containing resistance wire 38. The contact C is mounted or movable in unison with contact Ca so that the two move together, and the adjustment of the slide wires S and S1 is such, that no matter what the position of the contacts C and Ca may be, the resistances of the ratio arms C, Ca and CaX are always equal, the arrangement being preferably of the character of Leeds Patent No. 1,097,651.

The contact C may play over a scale S2 preferably calibrated to afford an indication of the concentration of the liquid, or the galvanometer G may control a recorder mechanism, as in Leeds Patent No. 1,125,699, in which case the contacts C and Ca are moved by the recorder to restore balance, and in restoring balance produce a record.

The operation is as follows:

Assuming that a liquid, as oil, is passing into tank 1 through pipe 5 from some source of supply, as a still, any water associated therewith will settle to the bottom of tank 1, and upon reaching a certain level will pass exteriorly through pipe 4.

To standardize the apparatus, the hydrometer is permitted to float freely in a liquid of definitely known specific gravity at the standard temperature, namely, 60 degrees F. The weights 30 and 30a on arm 29 are then adjusted to so position said arm and the temperature-responsive device T that the galvanometer G will assume a position indicative of the specific gravity referred to above, whereupon bolts 33 are tightened to secure the stem 32 of the hydrometer in fixed position with respect to the balance arm 29 which should now be in substantially a horizontal position.

Assuming that the temperature of the liquid passing through tank 1 remains at the standard temperature, but that the specific gravity becomes higher, i.e., the liquid changes in character or composition, the hydrometer will rise and move arm 29 of the temperature-responsive device T in a counter-clockwise direction, Fig. 3. However, due to the constant temperature, the volume of mercury in said device does not change and remains at the same horizontal level. Accordingly, the resistance wire 38 is moved further into the mercury and the resistance of the arm of the Wheatstone bridge including said resistance is lowered. As a result, the electrical system is disturbed and the galvanometer G caused to assume a new position indicative of the specific gravity of the liquid.

Obviously, the operation is the reverse of that just stated, if the specific gravity of the liquid falls while the standard temperature is maintained.

Assuming that the temperature of a liquid of definite and unchanging quality or composition passing through the tank 1 falls below the standard temperature, as aforesaid, for which the apparatus has been standardized, the specific gravity will rise, whereupon the hydrometer H will rise. As a result, arm 29 of the temperature-responsive device T is moved in a counter-clockwise direction, Fig. 3. However, the same drop in liquid temperature that causes the specific gravity to rise also affects the temperature-responsive device T and causes the mercury in arms 38 and 38a to contract, thereby tending to expose a greater length of said wires. However, a larger surface of wire 38 is not exposed, since the hydrometer H in turning this member in a counter-clockwise direction tends to move said wire further into the surrounding mercury column. When the various adjustments have been properly made, i. e., when the hydrometer H has been positioned a proper distance along the arm 29 from the temperature-responsive device T, the amount that the upward movement of the hydrometer, as aforesaid, tends to move the wire 38 further into the mercury in arm 21 is just counteracted by the contraction of the mercury column in said arm, with the result that the specific gravity recorded is that at standard temperature, namely, 60 degree F, and not that at the actual temperature of the liquid.

Obviously, when the temperature of a liquid of definite and unchanging quality or composition passing through tank 1 rises above the standard temperature, the specific gravity will fall, and an operation the reverse of that just stated will occur.

It results, therefore, that any change in specific gravity of the oil arising solely from change in the quality or composition thereof is recorded, but a change in specific gravity resulting from a change in temperature, is not recorded. Therefore, the observed specific gravity of the oil is that at standard temperature.

Figure 2:
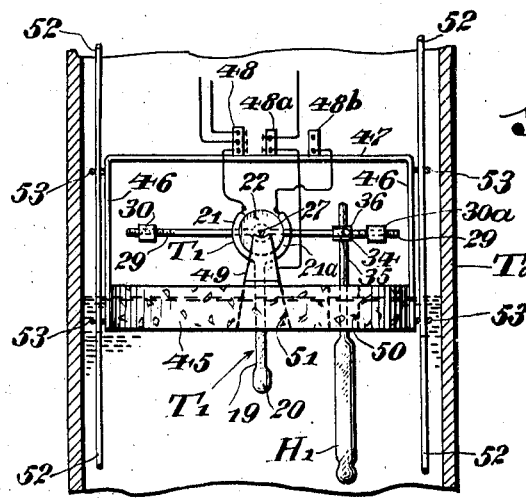
Fig. 2 is a vertical sectional view, partly in elevation, of a modified form of my invention.

Referring to Fig. 2, there is illustrated a modification of my invention comprising a relatively large receptacle Ta, as a storage tank, shown as partly filled with liquid. A suitable member 45 capable of floating on the surface of the liquid, as a cork disk, a hollow metal container imprisoning a quantity of gas, or other equivalent structure, carries a plurality of supporting rods 46 bridged by a plate carrying a number of binding posts or terminals 48, 48a and 48b. A pair of spaced standards 49 serve to support the temperature-responsive device T1 and the submerged float or hydrometer H1, which are preferably arranged as a combined structure and may take the form of the similar device described above, or of the form hereinafter described, or of other suitable form. Float 45 is provided with a substantially cylindrical shaped opening 50 through which the hydrometer moves, and with a tapered opening 51 permitting free oscillation of the temperature-responsive device T1.

If desired, float 45 and the mechanism carried thereby may be restrained from moving otherwise than in a substantially vertical direction by one or more wires or rods 52 suitably supported adjacent the top and bottom of tank Ta, each wire passing through one or more guides 53 suitably secured to the floating structure.

It will be readily understood that this form of my invention may be utilized to actuate suitable indicating or recording apparatus, for example, of the character described above in connection with Figs. 1, 3, 4, 5, and 6, in which case the operation is substantially the same as described.

Obviously, the temperature-responsive device forming a part of my apparatus may assume a variety of forms, for example, as illustrated in Figs. 7 or 8 or in Figs. 9 and 10. Referring first to Figs. 7 and 8, there is illustrated a temperature-responsive device T2 formed preferably of glass and comprising a stem 55 terminating at one end in a bulb 56 and at the other end in a disk-shaped hollow container 57 containing a suitable expansive fluid M1, as mercury. Temperature-responsive device T2 may be exhausted to a suitable degree, or may be supplied with an inert gas under suitable pressure, and is mounted for pivotal movement on a suitable supporting member, as the fork prongs 58 constructed substantially as indicated with respect to Figs. 1, 3, 4, 5, and 6.

Temperature-responsive device T2 may be supported in the prongs 58 of the fork in any suitable manner, and as one way of so doing, I utilize a pair of flanged clamping plates 59 and 59a held in fixed position on the container 57 by bolts 60, or equivalent. Plate 59 comprises an extension 61 carrying a spacing washer 62 and a knife edge 63 received in an opening in one of the prongs 58. Plate 59a comprises a polygonal extension 64 and a knife edge 65 received in an opening in the other prong 58. A balance arm 66, which may be of the character previously described, has a perforation corresponding to and receiving the polygonal extension 64 of plate 59a.

Suitable high resistance wires 67 and 67a are sealed in the wall of container 57 and are preferably curved to conform to the configuration of said container. The free ends of said wires extend into the pool of mercury and extend adjacent to each other, but not into engagement. A contact 68, likewise sealed in the wall of container 57, extends into the pool of mercury between the free ends of wires 67 and 67a.

Referring to Figs. 9 and 10, a receptacle T3, formed preferably of glass, comprises a stem 70 terminating at one end in a bulb 71 and at the other end in a U-shaped container 72, the arms of which are preferably connected by a tube 73. A quantity of suitable expansive fluid M2, as mercury, in the bulb 71 extends through stem 70 upwardly a substantial distance into the arms of container 72. Temperature-responsive device T3 may be exhausted to a suitable degree or may be supplied with an inert gas under suitable pressure, and is mounted for pivotal movement on a suitable supporting member, as the prongs 74 of a fork constructed substantially as indicated aforesaid.

Temperature-responsive device T3 may be supported in the prongs 74 in any suitable manner, and as one way of so doing, I utilize substantially the construction described in connection with Figs. 1, 3, 4, 5 and 6. As shown, a pair of clamping disks 75 and 75a form a substantially hemispherical groove 76 receiving the arms of container 72. A shaft 77 passing centrally through and supporting disks 75 and 75a comprises a collar 78, a polygonal portion 79 and a pair of knife edges 80 and 80a. Disk 75a fits against collar 78, and a nut 81 threaded to shaft 77 engages disk 75 to hold both disks and the device T3 fixed relative to shaft 77. Knife edges 80 and 80a are received in aligned apertures in the prongs 74, and, accordingly, shaft 77 and the device T3 are capable of free oscillatory movement. A balance arm 81a, which may be of the character previously described, has a perforation corresponding to and receiving the polygonal extension 79 of shaft 77.

Suitable high resistance wires 82 and 82a are sealed, respectively, in the arms of container 72 and extend substantial distances into the mercury contained therein. A contact 83 likewise sealed in the wall of container 72 extends into the mercury column between the free ends of wires 82 and 82a.

Obviously, wires 67, 67a and contact 68 in Figs. 7 and 8, and wires 82, 82a and contact 83 in Figs. 9 and 10, may be extended to actuate suitable indicating or recording apparatus, for example, of the character previously described.

Although I have described my invention as utilizable in indicating the specific gravity of a liquid, it will be obvious to those skilled in the art that the apparatus may be standardized by floating the hydrometer in a liquid, the concentration of which in degrees Baumé is definitely known. Then by suitably calibrating the galvanometer G, the concentration of the liquid may be determined in degrees Baumé. Or the galvanometer G may be otherwise suitably calibrated.

What I claim is:

1. In apparatus responsive to changes in the specific gravity of a liquid, the combination of a structure formed with a chamber containing mercury and in contact with said liquid and supporting a conductor dipping into said mercury to an extent depending on the temperature of said liquid, means for supporting the structure so that it may be adjusted to different positions and means for automatically adjusting the position of said receptacle and thereby varying the extent to which said conductor extends into the mercury, as the density of the liquid changes.

2. Apparatus responsive to changes in the specific gravity of a liquid comprising in combination a pivoted receptacle comprising a chamber partially filled with mercury and extending into contact with said liquid, a conductor carried by said receptacle and dipping into the mercury to an extent affected by the thermal expansion of the mercury and the angular position of said receptacle, and means connected to said receptacle and subjected to the flotative action of said liquid for adjusting the angular position of said receptacle as the density of said liquid changes.

ALLEN A. VAN ORSDALE.